(12) United States Patent
Irisawa et al.

(10) Patent No.: US 7,771,616 B2
(45) Date of Patent: *Aug. 10, 2010

(54) POLYMERIZABLE LIQUID CRYSTAL COMPOUND HAVING FUSED RING AND HOMO- AND COPOLYMER OF THE POLYMERIZABLE LIQUID CRYSTAL COMPOUND

(75) Inventors: Masatomi Irisawa, Saitama (JP); Tatsunori Kobayashi, Saitama (JP); Mineki Hasegawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 12/089,626

(22) PCT Filed: Aug. 24, 2006

(86) PCT No.: PCT/JP2006/316563

§ 371 (c)(1),
(2), (4) Date: Apr. 9, 2008

(87) PCT Pub. No.: WO2007/052403

PCT Pub. Date: May 10, 2007

(65) Prior Publication Data

US 2009/0137761 A1    May 28, 2009

(30) Foreign Application Priority Data

Oct. 31, 2005   (JP)   ............................. 2005-315699

(51) Int. Cl.
| C09K 19/32 | (2006.01) |
| C09K 19/38 | (2006.01) |
| C09K 19/20 | (2006.01) |
| C08F 20/26 | (2006.01) |
| C08F 20/30 | (2006.01) |
| C07C 69/76 | (2006.01) |
| C07C 69/94 | (2006.01) |

(52) U.S. Cl. ........................... 252/299.62; 252/299.67; 428/1.1; 526/319; 526/320; 526/323; 526/326; 560/80; 560/95; 560/100

(58) Field of Classification Search ............ 252/299.62, 252/299.67; 560/80, 100, 95; 526/326, 319, 526/320, 323; 428/1.1
See application file for complete search history.

(56) References Cited

U.S. PATENT DOCUMENTS 4,452,993 A    6/1984 Conciatori et al.

7,683,203 B2 *  3/2010  Irisawa et al. .................. 560/95
2007/0282087 A1 * 12/2007  Irisawa et al. ................ 526/243

FOREIGN PATENT DOCUMENTS

| JP | 11-116534 | 4/1999 |
| JP | 11-130729 | 5/1999 |
| JP | 11-513360 | 11/1999 |
| JP | 3228348 | 9/2001 |
| JP | 2002-365421 | 9/2002 |
| JP | 2002-308831 | 10/2002 |
| JP | 2002-308832 | 10/2002 |
| JP | 2005-15473 | 1/2005 |
| JP | 2005-206579 | 8/2005 |
| JP | 2005-263789 | 9/2005 |
| JP | 2005-309255 | 11/2005 |
| WO | 00/05189 | 2/2000 |
| WO | WO 2006/049111 | 5/2006 |

OTHER PUBLICATIONS

European Patent Office issued an European Search Report dated Mar. 11, 2010, Application No. 06782867.1.

* cited by examiner

*Primary Examiner*—Shean C Wu
(74) *Attorney, Agent, or Firm*—Young & Thompson

(57) ABSTRACT

A polymerizable liquid crystal compound of formula (1). The compound has high optical (refractive index) anisotropy ($\Delta n$), exhibits a liquid crystal phase at room temperature (having a broad liquid crystal phase temperature range) without crystallization, has high solubility in cyclohexanone, methyl ethyl ketone or like organic solvents, exhibits excellent coating properties and orientation properties, and, after polymerization, has high transparency.

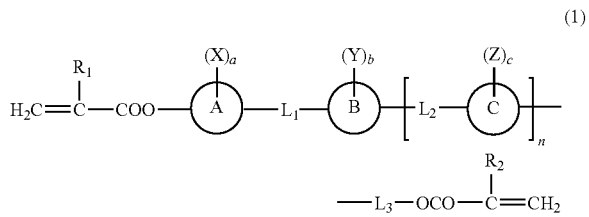

wherein $R_1$ and $R_2$ each represent hydrogen, a methyl group or halogen; rings A to C each represent a benzene ring, a naphthalene ring, etc.; at least one of rings A to C is a fused ring; X, Y, and Z each represent a C1 to C6 alkyl group, etc.; $L_1$, $L_2$, and $L_3$ each represent —COO—, —OCO—, —O($CH_2$)$_j$— (j=1 to 8), etc.; n is 0 or 1, and a to c are numbers such that the polymerizable liquid crystal compound may have at least one of X, Y, and Z.

16 Claims, No Drawings

POLYMERIZABLE LIQUID CRYSTAL COMPOUND HAVING FUSED RING AND HOMO- AND COPOLYMER OF THE POLYMERIZABLE LIQUID CRYSTAL COMPOUND

TECHNICAL FIELD

This invention relates to a polymerizable liquid crystal compound having a plurality of rings including at least one fused ring arranged to form a straight chain, having a substituent on the ring, and having a (meth)acryloyloxy group which may be substituted with a halogen atom, etc. The invention also relates to a homopolymer and a copolymer of the polymerizable liquid crystal compound. The homopolymer and the copolymer are useful as an optically anisotropic material.

BACKGROUND ART

When a liquid crystal compound having a polymerizable functional group (hereinafter referred to as a polymerizable liquid crystal compound) or a liquid crystal composition containing at least one kind of such a polymerizable liquid crystal compound (hereinafter referred to as a polymerizable liquid crystal composition) is irradiated with active energy rays such as ultraviolet rays while being in an oriented liquid crystalline phase, a polymer in which the liquid crystal molecules are fixed in their oriented state can be obtained. The polymer thus obtained exhibits anisotropy in physical properties such as refractive index, dielectric constant, magnetic susceptibility, elastic modulus, and thermal expansion coefficient and is therefore applicable as an optically anisotropic material, such as a retardation film, a polarizer, a polarizing prism, a luminance improving film, a low pass filter, various optical filters, and a covering of optical fibers. It is important for the optically anisotropic material (polymer) obtained by the polymerization to have not only the anisotropy but other characteristics such as polymerization rate, transparency after polymerization, mechanical strength, coating properties, solubility, crystallinity, shrinking properties, water permeability, water absorption, melting point, glass transition point, clear point, chemical resistance, and heat resistance.

Liquid crystals useful as the optically anisotropic material described include cholesteric liquid crystals showing specific liquid crystalline properties attributed to the helical structure of molecular alignment. Cholesteric liquid crystals exhibit selective reflection of light such that, when natural light enters in a direction parallel with the helical axis, approximately one half of light of a certain wavelength band is reflected in the form of right-handed (or left-handed) circularly polarized light and approximately another half of the light is transmitted in the form of left-handed (or right-handed) circularly polarized light. The bandwidth $\Delta\lambda$ of the light selectively reflected by the cholesteric liquid crystals is represented by $\Delta n \cdot P$ where $\Delta n$ is an optical (refractive index) anisotropy and P is the pitch of the helical structure. The pitch P is a specific value decided by the liquid crystal molecular structure. The larger the $\Delta n$, the broader the $\Delta\lambda$, namely, the broader the wavelength range in which the selective reflection occurs.

Retardation R that affects contrast of optical anisotropy is represented by $\Delta n \cdot d$ where $\Delta n$ is an optical (refractive index) anisotropy and d is a film thickness. Because R must be set at a specific value, making $\Delta n$ larger results in reduction of d. A smaller thickness of an optically anisotropic film makes it easier to control the liquid crystal orientation in polymerization. This brings about improvement of production yield, leading to improved production efficiency.

Polymerizable liquid crystal compounds having a (meth)acryl group as a polymerizable functional group have high polymerizability and provide polymers with high transparency, which have been studied extensively for use as an optically anisotropic material, as disclosed, e.g., in the patent documents (1) to (9).

Patent Document (1) JP 11-116534A

Patent Document (2) JP 11-1130729A

Patent Document (3) JP 11-513360 A

Patent Document (4) Japanese Patent 3228348

Patent Document (5) JP 2005-015473A

Patent Document (6) JP 2005-206579A

Patent Document (7) JP 2002-265421A

Patent Document (8) JP 2002-308831A

Patent Document (9) JP 2002-308832A

Of the polymerizable liquid crystal compounds with a (meth)acryl group disclosed in the patent documents (1) to (9) cited above, however, those of the documents (1) to (6) cannot be said to be sufficient in characteristics such as liquid crystalline properties, solvent solubility, coating properties, and optical anisotropy. In particular, those showing large optical (refractive index) anisotropy ($\Delta n$) have difficulty in providing practical optically anisotropic materials because some of them lack in solubility, coating properties or orientation properties and some others cannot be converted into film. Although the polymerizable liquid crystal compounds of the patent documents (7) to (9) have large $\Delta n$ values, are easy to apply to an alignment layer, and are easily oriented, they have disadvantages such as incapability of exhibiting a liquid crystal phase at room temperature, instability in film thickness after processed into film, and difficulty in controlling the orientation in film.

DISCLOSURE OF THE INVENTION

Problem to be Solved by the Invention

Accordingly, an object of the present invention is to provide a polymerizable liquid crystal compound that has high optical (refractive index) anisotropy ($\Delta n$) and yet exhibits a liquid crystal phase at room temperature (i.e., with a broad temperature range in which a liquid crystal phase is exhibited) without crystallization, has high solubility in organic solvents such as cyclohexanone and methyl ethyl ketone, exhibits excellent coating properties and orientation properties, and provides a highly transparent polymer, and to provide a (co) polymer of the polymerizable liquid crystal compound.

Means to Solve the Problem

To settle the problem, the present inventors have extensively researched various polymerizable liquid crystal compounds and found, as a result, that the object of the invention is accomplished by a polymerizable liquid crystal compound having a specific chemical structure and completed the present invention.

The present invention provides a polymerizable liquid crystal compound represented by general formula (1):

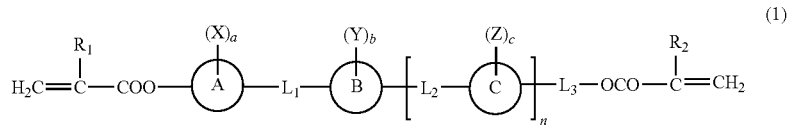

(1)

wherein $R_1$ and $R_2$ each independently represent a hydrogen atom, a methyl group or a halogen atom; rings A, B, and C each independently represent a benzene ring, a cyclohexane ring, a cyclohexene ring, a naphthalene ring, a tetrahydronaphthalene ring, a decahydronaphthalene ring, an anthracene ring or a phenanthrene ring, the —CH= moiety of some of which rings may be substituted with —N=, and the —CH$_2$— moiety of some of which rings may be substituted with —S— or —O—; at least one of the rings A, B, and C is a fused ring; X, Y, and Z each independently represent a substituted or unsubstituted alkyl group having 1 to 6 carbon atoms, a substituted or unsubstituted alkoxy group having 1 to 6 carbon atoms, a substituted or unsubstituted alkenyl group having 2 to 6 carbon atoms, a halogen atom, a cyano group, or a group represented by general formula (2), $L_1$, $L_2$, and $L_3$ each independently represent a single bond, —COO—, —OCO—, —(CH$_2$)$_h$—, —CH=CH—, —(CH$_2$)$_i$O—, —O(CH$_2$)$_j$—, —O(CH$_2$)$_k$O—, —OCOO(CH$_2$)$_l$—, —(CH$_2$)$_m$OCOO—, —(OCH$_2$CH$_2$)$_o$—, —(CH$_2$CH$_2$O)$_p$—, —(OCH$_2$CH(CH$_3$))$_q$—, —(CH(CH$_3$)CH$_2$)$_r$—, —(CH$_2$)$_s$O(CH$_2$)$_t$—, —O(CH$_2$)$_u$—[Si(CH$_3$)$_2$O]$_v$—Si(CH$_3$)$_2$(CH$_2$)$_w$—, —CH=CHCH$_2$O—, —OCH$_2$CH=CH—, —CH=CH—COO—, —OCO—CH=CH—, —C≡C—, —(CH$_2$)$_2$COO—, —OCO(CH$_2$)$_2$—, —CF=CF—, —OCF$_2$—, —CF$_2$O—, —C≡C—COO—, —OCO—C≡C—, or —O—; part of the carbon atoms of $L_1$, $L_2$, and $L_3$ may be replaced with a silicon atom(s); n represents 0 or 1; h, i, j, k, l, m, and n each independently represent an integer of 1 to 8; o, p, q, r, s, t, u, v, and w each independently represent an integer of 1 to 3; a, b, and c represent the numbers of the substituents on the rings A, B, and C, respectively, being an integer of (2d+2) or smaller, where d is the number of the 6-membered rings contained in the monocyclic or fused rings A, B, and C, respectively; when n=0, at least one of a and b is 1 or greater; and when n=1, at least one of a, b, and c is 1 or greater.

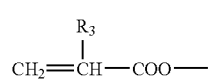

(2)

wherein $R_3$ represents a hydrogen atom, a methyl group or a halogen atom.

The present invention also provides a homopolymer obtained by polymerization of the polymerizable liquid crystal compound, a copolymer obtained by copolymerizing the polymerizable liquid crystal compound with other compound having an ethylenically unsaturated bond (hereinafter "ethylenically unsaturated compound"), and a copolymer obtained by copolymerizing the polymerizable liquid crystal compound with a comonomer having an optically active group.

The present invention also provides an optically anisotropic material comprising at least one member selected from the group consisting of the above described homopolymer and copolymers.

BEST MODE FOR CARRYING OUT THE INVENTION

The present invention will be described in greater detail with reference to its preferred embodiments.

In general formula (1), examples of the halogen atom as represented by $R_1$, $R_2$, X, Y, and Z include a fluorine atom, a chlorine atom, a bromine atom, and an iodine atom. Examples of the substituted or unsubstituted alkyl group having 1 to 6 carbon atoms as represented by X, Y, and Z include methyl, chloromethyl, trifluoromethyl, cyanomethyl, ethyl, dichloroethyl, propyl, isopropyl, butyl, sec-butyl, t-butyl, isobutyl, amyl, isoamyl, t-amyl, hexyl, 2-hexyl, 3-hexyl, cyclohexyl, and 1-methylcyclohexyl. Examples of the substituted or unsubstituted alkoxy group having 1 to 6 carbon atoms include methoxy, chloromethoxy, trifluoromethoxy, cyanomethoxy, ethoxy, dichloroethoxy, propoxy, isopropoxy, butoxy, sec-butoxy, tert-butoxy, isobutoxy, amyloxy, isoamyloxy, tert-amyloxy, hexyloxy, and cyclohexyloxy. Examples of the substituted or unsubstituted alkenyl group having 2 to 6 carbon atoms include vinyl, 1-methylethenyl, 2-methylethenyl, propenyl, butenyl, isobutenyl, pentenyl, and hexenyl.

Examples of the halogen atom as represented by $R_3$ in general formula (2) are the same as those recited for $R_1$.

The polymerizable liquid crystal compound represented by general formula (1) is exemplified by those represented by general formula (3):

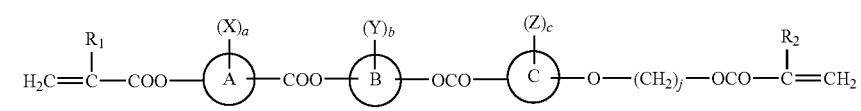

(3)

wherein $R_1$, $R_2$, ring A, ring B, ring C, X, Y, Z, a, b, c, and j are as defined above; and at least one of the rings A, B, and C is a fused ring.

While all the compounds represented by general formula (1) are the polymerizable liquid crystal compounds of the present invention, those represented by general formula (3) are preferred for their superiority in liquid crystalline properties, solubility, and transparency.

Specific examples of the polymerizable liquid crystal compounds represented by general formula (3) are shown below for illustrative purposes but not for limitation.

Compound No. 1

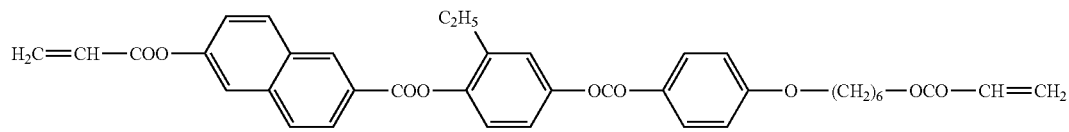

Compound No. 2

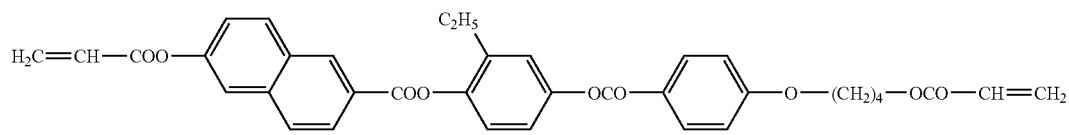

Compound No. 3

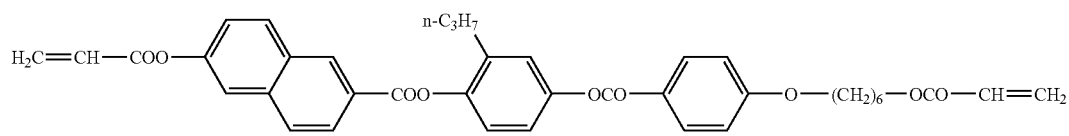

Compound No. 4

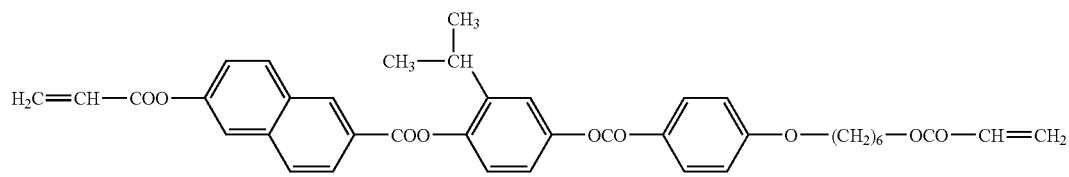

Compound No. 5

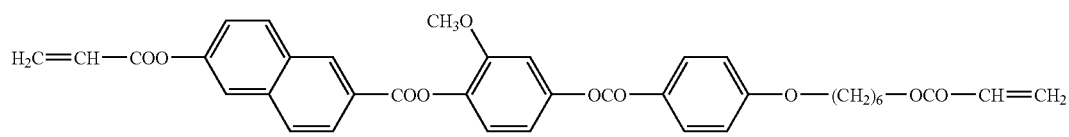

Compound No. 6

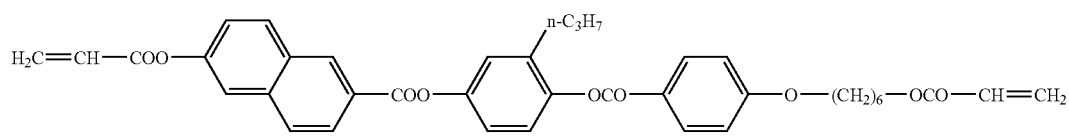

Compound No. 7

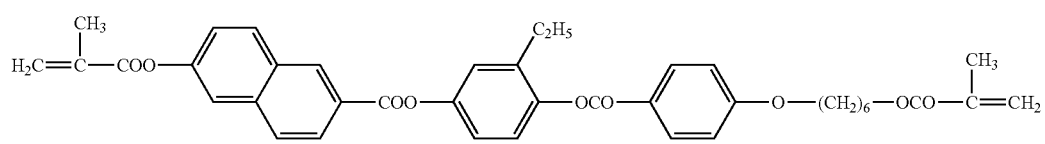

Compound No. 8

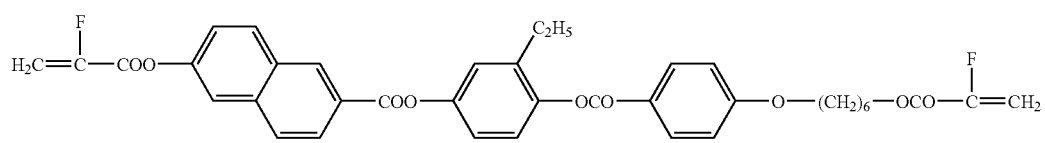

Compound No. 9

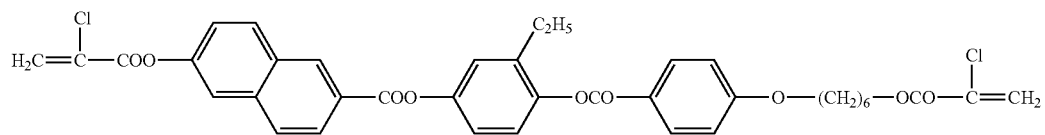

-continued
Compound No. 10
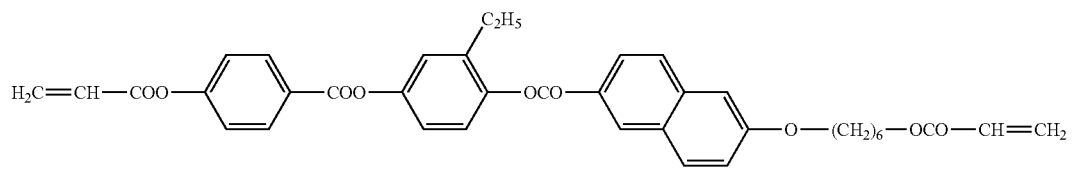
Compound No. 11
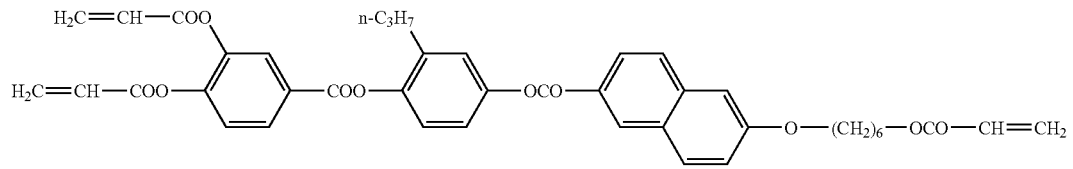
Compound No. 12
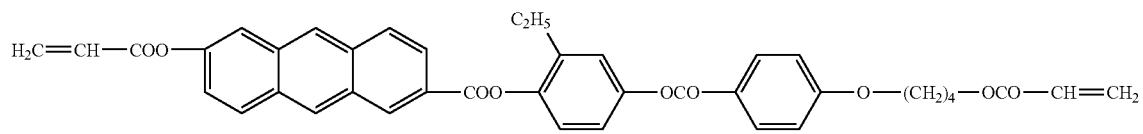
Compound No. 13
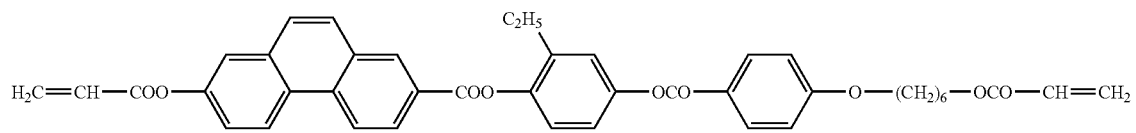
Compound No. 14
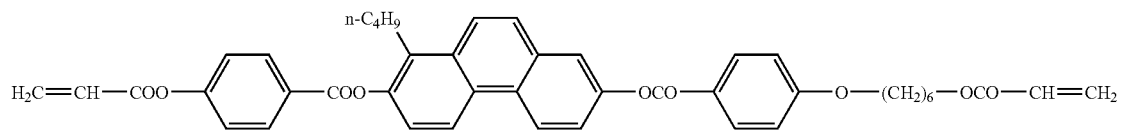
Compound No. 15
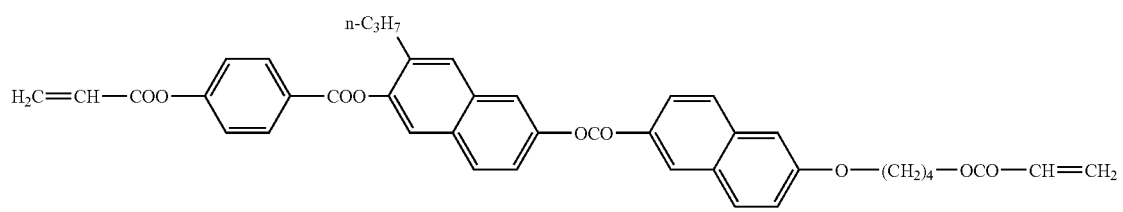
Compound No. 16
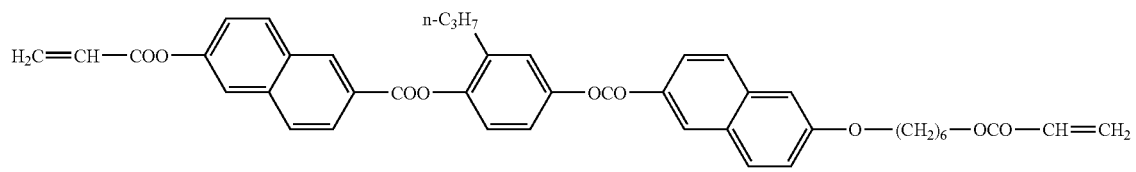
Compound No. 17
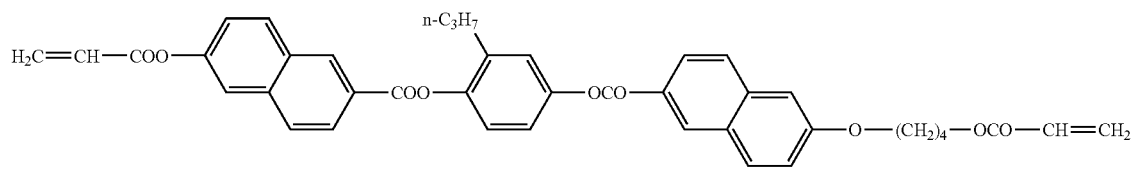

-continued

Compound No. 18
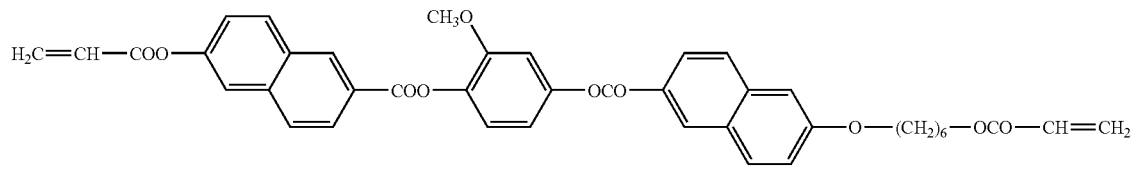

Compound No. 19
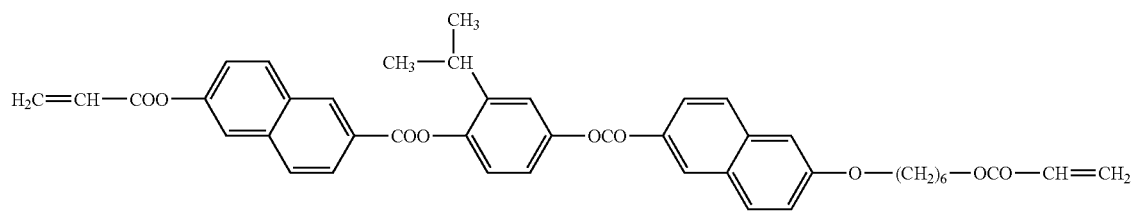

Compound No. 20
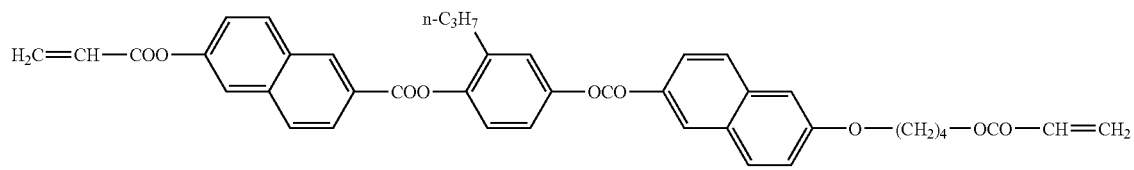

Compound No. 21
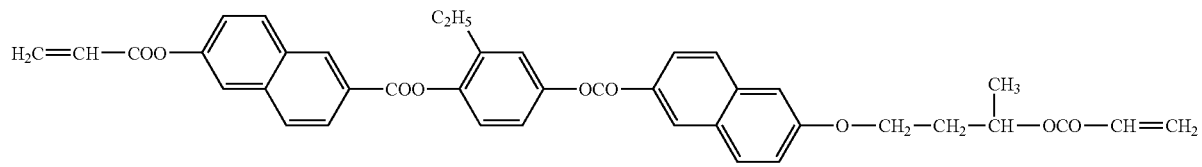

Compound No. 22
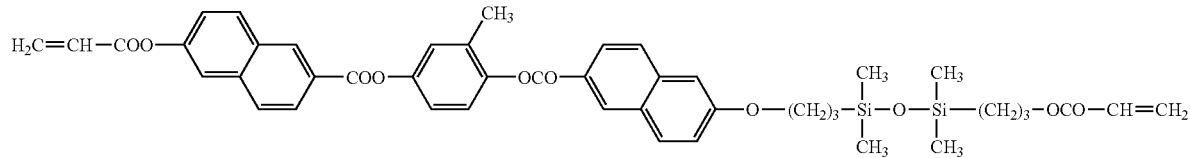

The polymerizable liquid crystal compound of the invention is not limited by the process of preparation and can be prepared by making use of known reactions. For instance, the polymerizable liquid crystal compound of general formula (1) in which $L_1$ is —COO—, $L_2$ is —OCO—, and n is 1 can be synthesized in accordance with the reaction scheme shown below. In the reaction scheme shown, replacing $L_3$ with —O(CH$_2$)$_j$— (j=1 to 8) gives the polymerizable liquid crystal compounds represented by general formula (3).

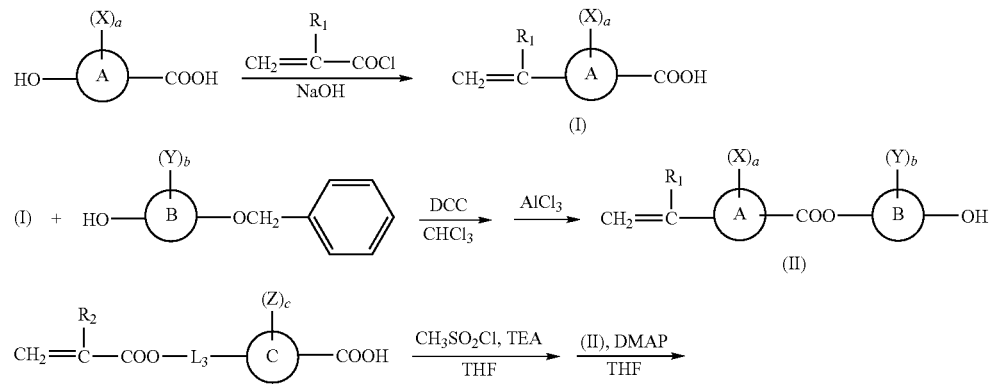

-continued

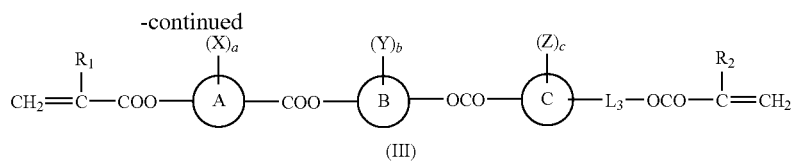
(III)

DCC: Dicyclohexylcarbodiimide
TEA: Triethylamine
THF: Tetrahydrofuran
DMAP: 4-Dimethylaminopyridine The polymerizable liquid crystal compound of the present invention is a liquid crystal monomer that can be homopolymerized or copolymerized with each other or with an ethylenically unsaturated compound. Examples of the copolymerizable ethylenically unsaturated compound include ethylenically unsaturated, liquid crystal monomers other than the polymerizable liquid crystal compounds of the present invention (hereinafter referred to as "other liquid crystal monomer(s)"), monomers having an optically active group, and compounds like (meth)acrylic esters. These ethylenically unsaturated compounds may be used in an adequate amount according to their structure. They are preferably used in a total amount such that the proportion of the polymerizable liquid crystal compound of the invention may be at least 5% by weight, more preferably in the range of from 10% to 100% by weight.

Compounds H-1 through H-14 shown below are specific examples of the other liquid crystal monomers.

Compound H-1
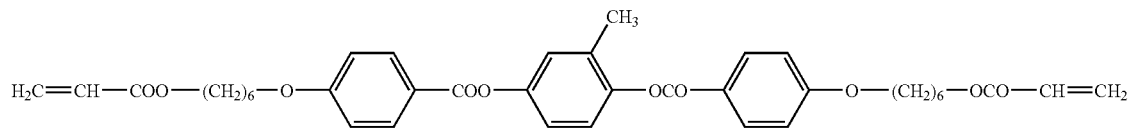

Compound H-2
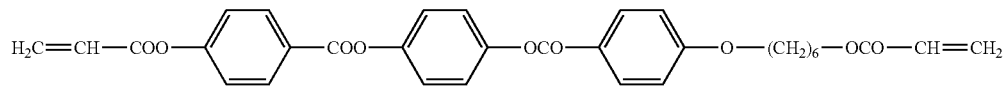

Compound H-3
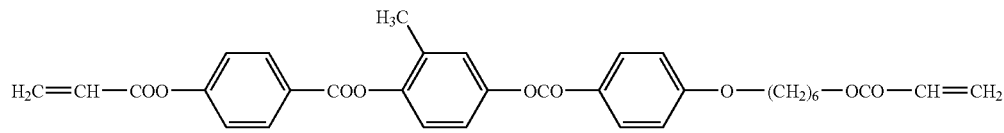

Compound H-4
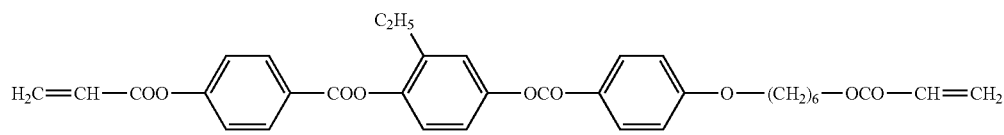

Compound H-5
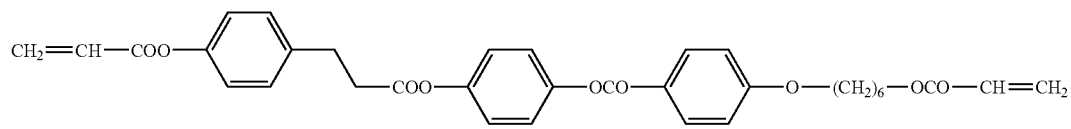

Compound H-6
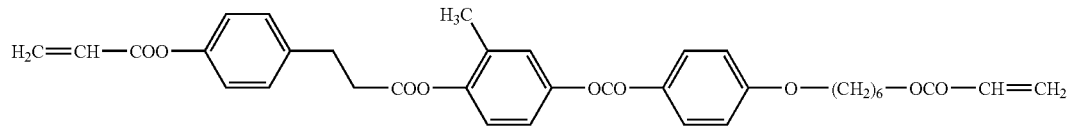

Compound H-7
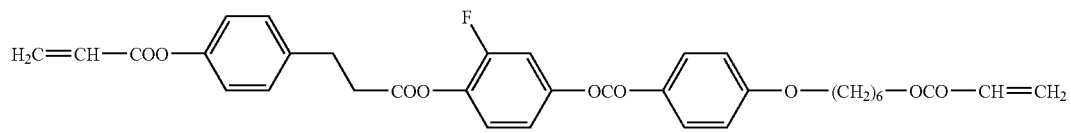

-continued

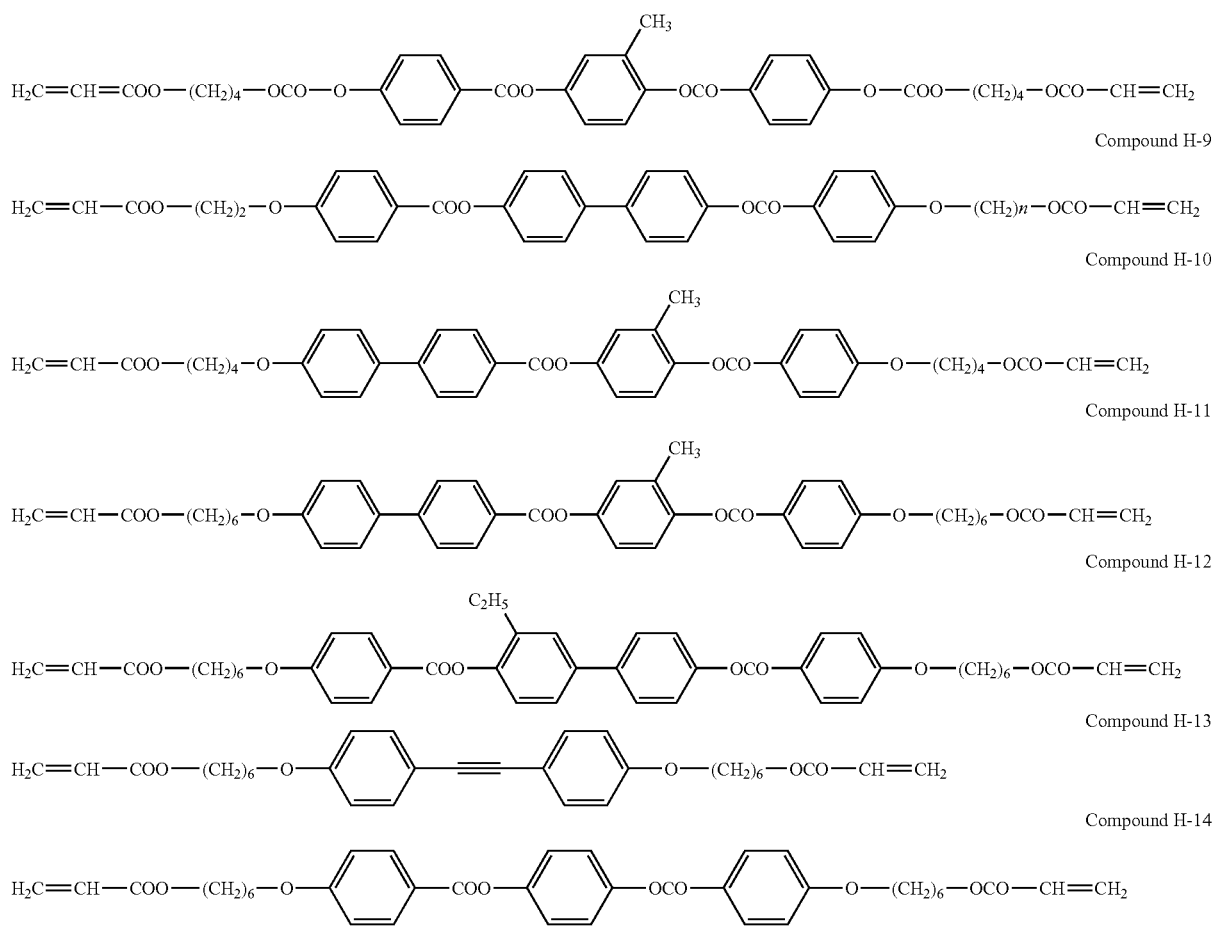

Examples of the monomers having an optically active group include the optically active compounds recited hereunder which have an ethylenically unsaturated bond and compounds having at least one epoxide group such as an epoxy group and an oxetane group and an optically active group.

Examples of the ethylenically unsaturated compounds like (meth)acrylic esters include (meth)acrylic esters such as methyl (meth)acrylate, ethyl (meth)acrylate, propyl (meth)acrylate, butyl (meth)acrylate, sec-butyl (meth)acrylate, tert-butyl (meth)acrylate, hexyl (meth)acrylate, 2-ethylhexyl (meth)acrylate, tetrahydrofurfuryl (meth)acrylate, glycidyl (meth)acrylate, allyl (meth)acrylate, allyloxy (meth)acrylate, cyclohexyl (meth)acrylate, benzyl (meth)acrylate, 1-phenylethyl (meth)acrylate, 2-phenylethyl (meth)acrylate, furfuryl (meth)acrylate, diphenylmethyl (meth)acrylate, naphthyl (meth)acrylate, pentachlorophenyl (meth)acrylate, 2-chloroethyl (meth)acrylate, methyl α-chloro(meth)acrylate, phenyl α-bromo(meth)acrylate, trifluoroethyl (meth)acrylate, tetrafluoropropyl (meth)acrylate, polyethylene glycol di(meth)acrylate, 1,4-butanediol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate; diacetone acrylamide, styrene, vinyltoluene, and divinylbenzene.

As previously stated, the polymerizable liquid crystal compounds of the invention can be (co)polymerized to provide liquid crystal (co)polymers.

The (co)polymer of the polymerizable liquid crystal compound of the invention is obtained by (co)polymerizing a polymerizable liquid crystal composition containing the polymerizable liquid crystal compound of the invention. The content of the polymerizable liquid crystal compound of the invention in the polymerizable liquid crystal composition is preferably 10% to 95% by mass.

When the (co)polymer of the polymerizable liquid crystal compound of the invention is for use as an optically anisotropic material, it is preferred for the (co)polymer to exhibit a liquid crystal phase at least at a temperature around room temperature, more preferably at 20° C. or lower temperatures.

The polymerizable liquid crystal composition may contain a liquid crystal compound other than the polymerizable liquid crystal compound of the invention, for example, the other liquid crystal monomers recited above. It is preferred, nevertheless, that the amount of the liquid crystal compound(s) other than the polymerizable liquid crystal compound of the invention in the polymerizable liquid crystal composition be not more than 50% by mass, more preferably 30% by mass or less, in order to secure heat resistance of the resultant polymer.

To improve polymerizability, the polymerizable liquid crystal composition can contain a polymerization initiator such as a thermal initiator or a photoinitiator. The amount of the initiator, if used, is preferably 10% by mass or less, more preferably 5% by mass or less, even more preferably 0.5% to 3% by mass, based on the polymerizable liquid crystal composition.

Any known thermal initiators can be used in the invention. Examples include peroxides such as benzoyl peroxide, 2,4-dichlorobenzoyl peroxide, 1,1-di(t-butylperoxy)-3,3,5-trimethylcyclohexane, 4,4-di(t-butylperoxy)butyl valerate, and dicumyl peroxide; azo compounds such as 2,2'-azobisisobutyronitrile; and tetramethylthiuram disulfide.

Examples of useful photoinitiators include benzoins such as benzoin, benzoin methyl ether, and benzoin propyl ether; acetophenones such as acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-methyl-1-[4-(methylthio)phenyl]-2-morpholino-propan-1-one, and N,N-dimethylaminoacetophenone; anthraquinones such as 2-methylanthraquinone, 1-chloroanthraquinone, and 2-amylanthraquinone; thioxanthones such as 2,4-dimethylthioxanthone, 2,4-diethylthioxanthone, 2-chlorothioxanthone, and 2,4-diisopropylthioxanthone; ketals such as acetophenone dimethyl ketal and benzyl dimethyl ketal; benzophenones such as benzophenone, methylbenzophenone, 4,4'-dichlorobenzophenone, 4,4'-bisdiethylaminobenzophenone, Michler's ketone, and 4-benzoyl-4'-methyldiphenyl sulfide; oxides such as 2,4,6-trimethylbenzoyldiphenylphosphine oxide; and carbazoles such as 3-(2-methyl-2-morpholinopropionyl)-9-methylcarbazole. The photoinitiators may be used either individually or as a combination of two or more thereof.

The polymerizable liquid crystal composition may contain a stabilizer to have improved storage stability. Examples of useful stabilizers include hydroquinone, hydroquinone monoalkyl ethers, tert-butyl catechols, pyrogallols, thiophenols, nitro compounds, 2-naphtylamines, and 2-hydroxynaphthalenes. The amount of the stabilizer, if used, is preferably not more than 1% by mass, more preferably 0.5% by mass or less, based on the polymerizable liquid crystal composition.

The polymerizable liquid crystal composition may further contain an optically active compound to provide a polymer having a helical structure of the liquid crystal skeleton in the inside thereof. The optically active compound is exemplified by those represented by formulae below.

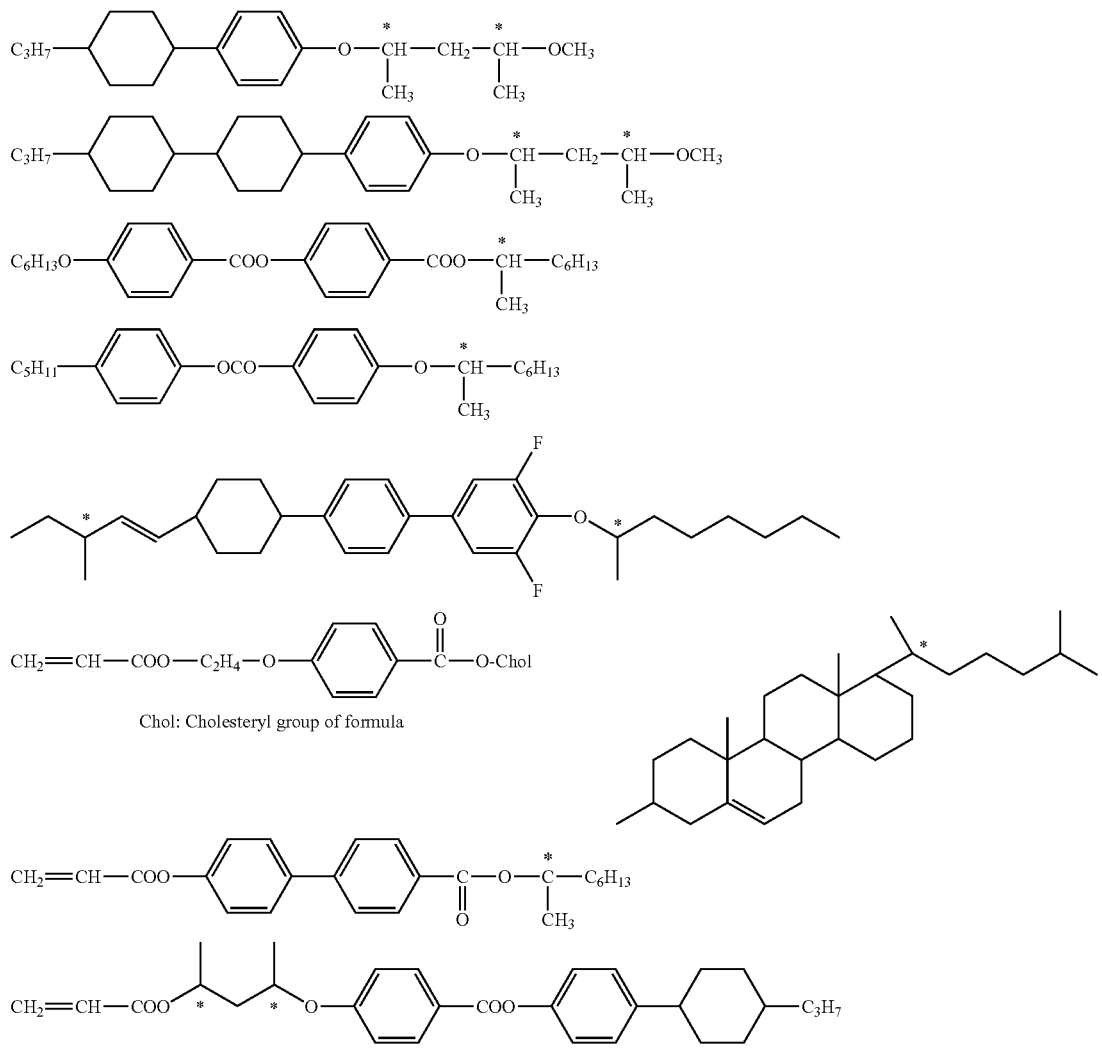

-continued

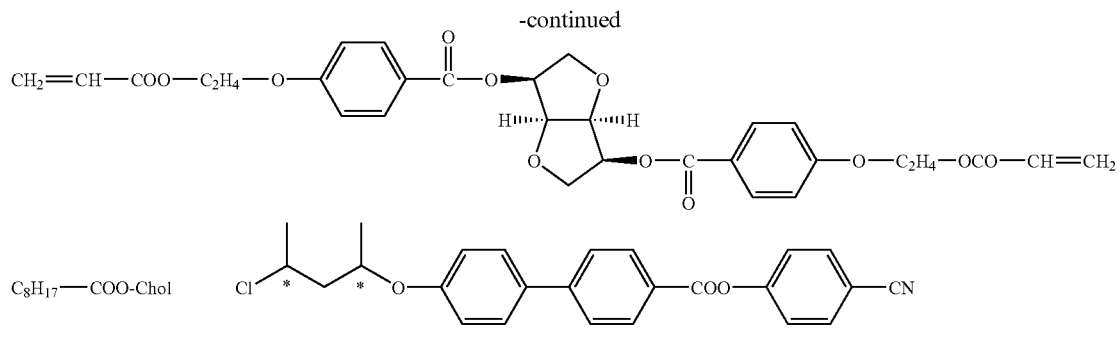

15

When the polymerizable liquid crystal composition is used in applications to polarizing films, alignment layers, printing inks, coatings, protective films, and so forth, the composition may contain other components selected according to the application, including metals, metal complexes, dyes, pigments, other colorants, fluorescent materials, phosphorescent materials, surface active agents, leveling agents, thixotropic agents, gelling agents, polysaccharides, UV absorbers, IR absorbers, antioxidants, ion exchange resins, metal oxides (e.g., titanium oxide), polymerization inhibitors, photo sensitizers, crosslinking agents, and liquid crystal alignment assisting agents.

The polymerizable liquid crystal compound of the invention is polymerized or copolymerized to give an optically anisotropic material made of a (co)polymer of the polymerizable liquid crystal compound of the invention. The optically anisotropic material can be produced by applying a polymerizable liquid crystal composition to a substrate and, after drying, irradiating the coating film with ultraviolet rays, etc. to induce polymerization, the composition containing the polymerizable liquid crystal compound of the invention and, if desired, various additive components such as other liquid crystal compounds and further containing, if desired, a solvent to dissolve the components. Examples of preferred substrates include, but are not limited to, plates of glass, polyethylene terephthalate, polycarbonate, polyimide, polyamide, polymethyl methacrylate, polystyrene, polyvinyl chloride, polytetrafluoroethylene, cellulose, silicone, or calcite, and a reflector plate. The polymerizable liquid crystal composition containing the polymerizable liquid crystal compound of the invention can be applied to the substrate by known coating techniques including curtain coating, extrusion coating, roll coating, spin coating, dipping, bar coating, spraying, slide coating, and printing.

Examples of the solvent that can be used in the preparation of the (co)polymer of the polymerizable liquid crystal compound of the invention include tetrahydrofuran, cyclohexanone, and methyl ethyl ketone.

In making an optically anisotropic material of the polymerizable liquid crystal compound (co)polymer, the polymerizable liquid crystal compound is oriented by, for example, previously subjecting a substrate to an alignment treatment. Such an alignment treatment of the substrate is preferably carried out by providing a liquid crystal alignment layer, such as a polyimide alignment layer, a polyamide alignment layer, or a polyvinyl alcohol alignment layer, on the substrate, followed by rubbing or a like operation. The polymerizable liquid crystal compound may also be oriented by applying a magnetic field or an electric field to the polymerizable liquid crystal compound. The thickness of the optically anisotropic material thus formed is decided as appropriate to the use of the optically anisotropic material and the like, and is preferably selected from the range of from 0.01 to 100 μm.

The polymerizable liquid crystal compound can be polymerized by known processes using heat or electromagnetic waves. UV radiation-induced radical polymerization in the presence of a photoinitiator is a preferred mode of electromagnetic radiation polymerization. Polymerization in a magnetic field or an electric field is also preferred. The liquid crystal (co)polymer formed on the substrate may be used as such or, where necessary, stripped off the substrate or transferred onto a different substrate.

The (co)polymer of the polymerizable liquid crystal compound of the invention is useful as an optically anisotropic material such as a retardation film of liquid crystal displays, an optical compensator (retardation plate) of liquid crystal displays, an alignment layer, a polarizer, a viewing angle compensation film, a reflecting film, and a color filter of liquid crystal displays, optical elements such as a holographic element, a polarizing prism, and an optical head, a low pass filter, a luminance improving film, and a polarization beam splitter.

EXAMPLES

The present invention will now be illustrated in greater detail by way of Synthesis Examples and Examples, but it should be understood that the invention is not limited thereto.

The structure of the compounds obtained in Synthesis Examples and Examples was confirmed by nuclear magnetic resonance ($^1$H-NMR) analysis and infrared (IR) absorption analysis. The thermal transition behavior of the compounds was observed using a DSC and a polarizing microscope. C, N, and I stand for a crystal phase, a nematic phase, and an isotropic liquid phase, respectively.

Synthesis Example 1

Synthesis of Compound No. 16

Compound No. 16 was synthesized through steps 1 to 3.

Step 1: Synthesis of Benzyl Ether

A benzyl ether was prepared in accordance with the following reaction scheme.

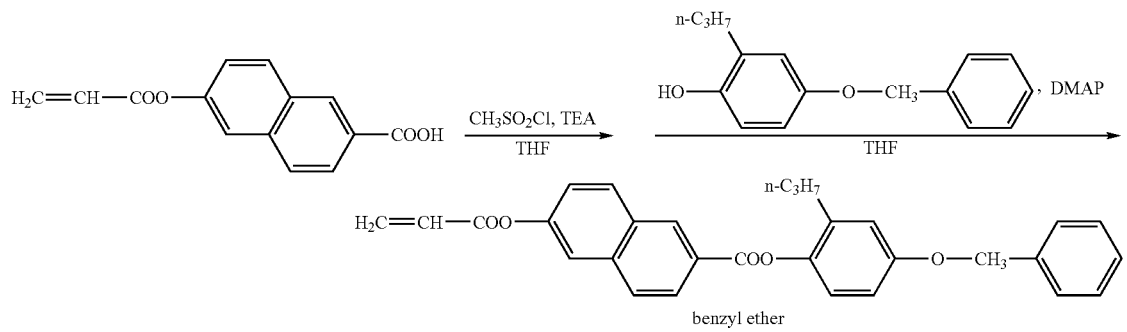

In 10 g of THF was dissolved 1.90 g (7.86 mmol) of 6-acryloyloxy-2-naphthoic acid, and the solution was cooled to −30° C. To the solution was added 0.99 g (8.65 mmol) of methanesulfonyl chloride, and 1.91 g (18.87 mmol) of triethylamine (TEA) was added thereto dropwise, followed by stirring for 1 hour. To the mixture were added 10 mg (0.08 mmol) of 4-dimethylaminopyridine (DMAP) and then a solution of 2.00 g (8.25 mmol) of 4-benzyloxy-2-n-propylphenol in 7 g of THF, followed by stirring for 1 hour. The precipitate formed was removed by filtration, and the filtrate was washed with water and evaporated to remove the solvent. The residue was purified by column chromatography on silica with dichloromethane as an eluent. Recrystallization from acetone gave 2.27 g (61.9%) of the desired benzyl ether as a white solid.

Step 2: Synthesis of Phenol

A phenol compound was synthesized through the following reaction scheme.

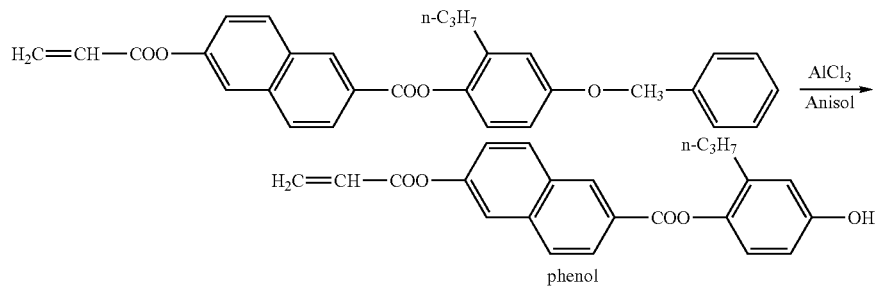

In 9 g of anisole was dissolved 2.01 g (15.08 mmol) of anhydrous aluminum chloride, and the solution was cooled in an ice water bath. A solution of 2.27 g (4.87 mmol) of the benzyl ether obtained in step 1 in 9 g of anisole was added dropwise to the cooled solution, followed by stirring from 1 hour. Hydrochloric acid was added thereto dropwise to dissolve the precipitate. The reaction mixture was washed with water and evaporated to remove the solvent. The residue was purified by column chromatography on silica with ethyl acetate/toluene (=1/5) as an eluent and recrystallized from an acetone/methanol mixed solvent to give 1.20 g (65.6%) of the desired phenol compound as a white solid.

Step 3: Synthesis of Compound No. 16

Compound No. 16 was synthesized through the following reaction scheme.

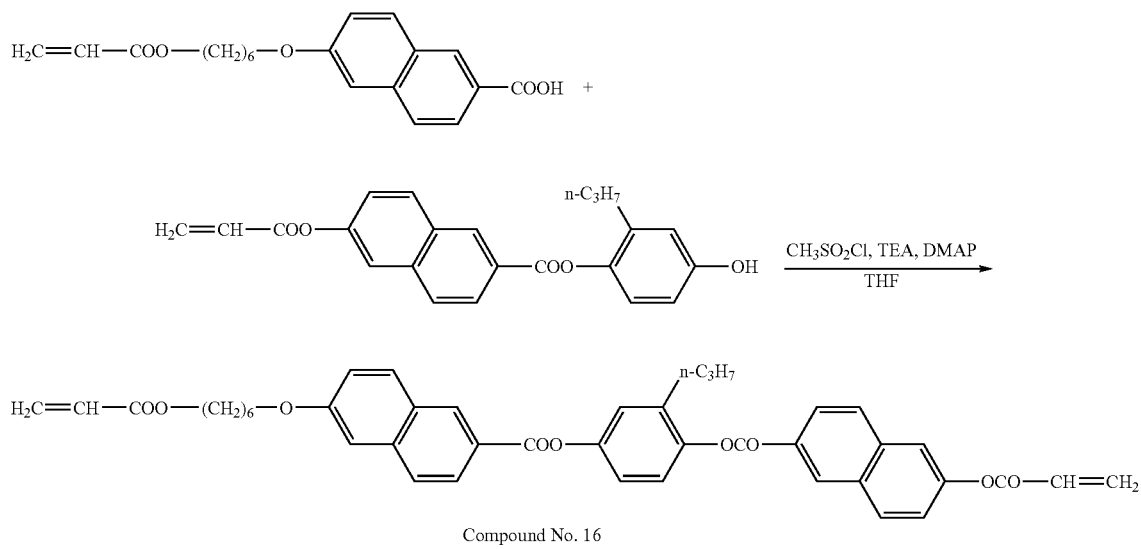

Compound No. 16

In 12 g of THF was dissolved 1.04 g (3.04 mmol) of 6-(6-acryloyloxy-hexyloxy)-2-naphthoic acid, followed by cooling to −30° C. To the solution was added 0.38 g (3.34 mmol) of methanesulfonyl chloride, and 0.74 g (7.29 mmol) of triethylamine was further added thereto dropwise. After stirring the mixture for 1 hour, 4 mg (0.03 mmol) of DMAP was added, and a solution of 1.20 g (3.19 mmol) of the phenol compound obtained in step 2 in 8 g of THF was added dropwise, followed by stirring for 1 hour. The precipitate thus formed was removed by filtration, and the filtrate was washed with water and evaporated to remove the solvent. The residue was purified by column chromatography on silica with ethyl acetate/toluene (=1/5) as an eluent and recrystallized from an ethyl acetate/hexane mixed solvent to yield 0.67 g (31.5%) of a white solid, which was analyzed to be compound No. 16. The results of the analyses are shown below.

Analysis Results (1) IR (cm$^{-1}$)

2936, 2866, 1624, 1474, 1404, 1339, 1273, 1246, 1200, 1169, 1150, 1065, 1022

(2) $^1$H-NMR (ppm)

0.9 (t, 3H), 1.5-1.9 (m, 10H), 2.6 (q, 2H), 3.9-4.3 (m, 4H), 5.7-6.6 (m, 6H), 7.1-7.5 (m, 6H), 7.7-8.3 (m, 7H), 8.7 (s, 1H), 8.9 (s, 1H)

(3) Thermal transition behavior 101 (° C.)   150 < (Thermal polymerization) < 20

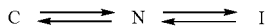

C: Crystal phase;
N: Nematic phase;
I: Isotropic liquid phase

Examples 1 and 2 and Comparative Examples 1 to 3

Compound No. 1 synthesized in the same manner as in Synthesis Example 1 (Example 1), compound No. 16 obtained in Synthesis Example 1 (Example 2), and comparative compounds H-1, H-12, and H-13 (Comparative Examples 1 to 3) were evaluated as a polymerizable liquid crystal compound for solvent solubility, liquid crystalline properties after polymerization, and transparency after polymerization in accordance with the methods described below. The results obtained are shown in Table 1.

(1) Solvent Solubility

To an organic solvent (cyclohexanone or methyl ethyl ketone (MEK)) was added 33% by mass of the polymerizable liquid crystal compound. After the mixture was left to stand for 1 hour, the system was observed with the naked eye to see if the polymerizable liquid crystal compound dissolved. The compound that dissolved was rated "good (in solvent solubility)", and the compound that did not dissolve or once dissolved but showed change in state such as crystallization was rated "bad (in solvent solubility)".

(2) Liquid Crystalline Properties After Polymerization

One gram of the polymerizable liquid crystal compound was dissolved in 2 g of cyclohexanone by stirring, and 0.05 g of a photopolymerization initiator (Irgacure 907 from Ciba Specialties Chemicals Inc.) was added thereto and completely dissolved in cyclohexane. The resulting solution was applied with a bar coater on a glass plate having a rubbed polyimide alignment layer and dried at 100° C. for 3 minutes. After cooling to room temperature, the coating film was irradiated with 330 mJ/cm$^2$ of ultraviolet light from a mercury lamp to obtain an optically anisotropic film (polymer). The optically anisotropic film thus formed was found to have a thickness of 1.2 to 1.5 μm with a contact thickness gauge. The liquid crystalline properties after polymerization was evaluated by observing the optically anisotropic film under a polarizing microscope. The sample that showed a liquid crystal phase was rated "good", and the sample that did not was rated "bad".

(3) Transparency After Polymerization

The optically anisotropic film obtained above (in the evaluation of liquid crystalline properties after polymerization) which secured good visibility with no coloration was rated "good", and the one which did not due to coloration was rated "bad".

TABLE 1

| | Polymerizable Liquid Crystal Compound | Solubility (before polymerization) | | After Polymerization | |
|---|---|---|---|---|---|
| | | Cyclo-hexanone | MEK | Crystalline Properties | Transparency |
| Example 1 | compound No. 1 | good | good | good | good |
| Example 2 | compound No. 16 | good | good | good | good |
| Comp. Example 1 | compound H-1 | good | bad | bad*[1] | bad*[2] |
| Comp. Example 2 | compound H-12 | bad | bad | bad*[1] | bad*[2] |
| Comp. Example 3 | compound H-13 | good | bad | bad*[1] | bad (pale yellow tinted) |

*[1] Unmeasurable due to crystallization
*[2] White turbidity due to crystallization was observed.

It is apparent from Table 1 that the polymerizable liquid crystal compounds of the present invention are superior to the polymerizable liquid crystal compounds of Comparative Examples 1 to 3 (compounds H-1, H-12, and H-13) in terms of solvent solubility and liquid crystalline properties after polymerization as well as transparency after polymerization. Seeing that the compound of Comparative Example 2 (compound H-12), which has the same number of 6-membered rings as the compound of Example 1 (compound No. 1), has poor solvent solubility and loses liquid crystalline properties on polymerizing, the excellent solvent solubility and liquid crystalline properties after polymerization as possessed by the polymerizable liquid crystal compounds of the invention are particularly noteworthy.

Examples 3 to 5 and Comparative Examples 4 to 7—Comparison of Optical (Refractive Index) Anisotropy Δn The optical (refractive index) anisotropy Δn of compound No. 1 (Example 3) and 10 (Example 4) synthesized in the same manner as in Synthesis Example 1, compound No. 16 obtained in Synthesis Example 1 (Example 5), and comparative compounds H-1, H-2, H-3, and H-8 (Comparative Examples 4 to 7) as a polymerizable liquid crystal compound was obtained. Δn was calculated by extrapolating the physical properties of a composition consisting of a nematic liquid crystal ester compound and 10% by mass of the polymerizable liquid crystal compound. The results are shown in Table 12.

TABLE 2

| | Compound | Optical (Refractive Index) Anisotropy Δn |
|---|---|---|
| Example 3 | compound No. 1 | 0.216 |
| Example 4 | compound No. 10 | 0.228 |
| Example 5 | compound No. 16 | 0.246 |
| Comp. Example 4 | H-1 | 0.170 |
| Comp. Example 5 | H-2 | 0.210 |

TABLE 2-continued

| | Compound | Optical (Refractive Index) Anisotropy Δn |
|---|---|---|
| Comp. Example 6 | H-3 | 0.206 |
| Comp. Example 7 | H-8 | 0.148 |

It is seen from Table 2 that the polymerizable liquid crystal compounds of the present invention apparently have higher Δn values. From this the conclusion is drawn that a liquid crystal material with a smaller thickness can be formed by (co)polymerizing the polymerizable liquid crystal compound of the invention as a monomer and that the resulting cholesteric liquid crystal material ((co)polymer) has a broader wavelength bandwidth for selective reflection.

INDUSTRIAL APPLICABILITY

The (co)polymer of the present invention is a liquid crystal substance useful as an optically anisotropic material. The polymerizable liquid crystal compound that can be used as a monomer of the (co)polymer of the invention is highly soluble in organic solvents and, after polymerization, exhibits excellent liquid crystalline properties and transparency. Furthermore, since the polymerizable liquid crystal compound has high optical (refractive index) anisotropy (Δn), it provides, on (co)polymerization, an optically anisotropic film with a reduced thickness or a cholesteric liquid crystal material with a broadened wavelength bandwidth for selective reflection.

Compound No. 1
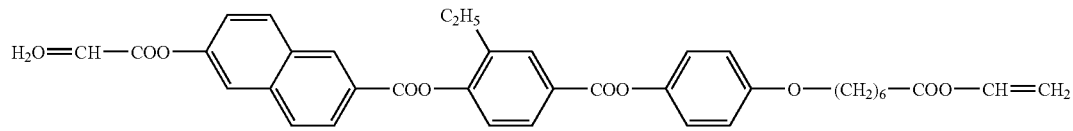
Compound No. 2
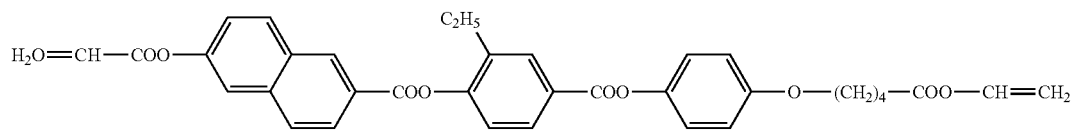
Compound No. 3
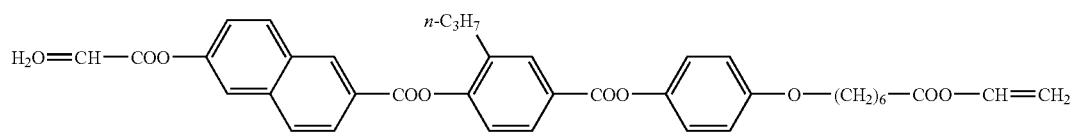
Compound No. 4
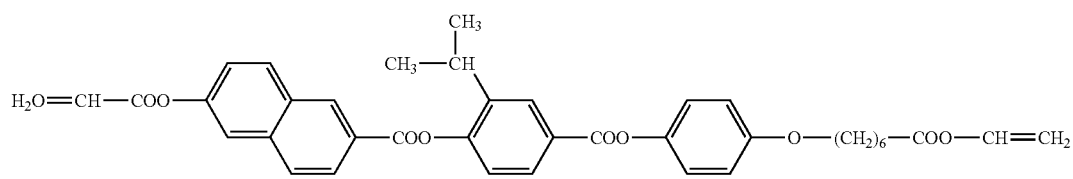
Compound No. 5
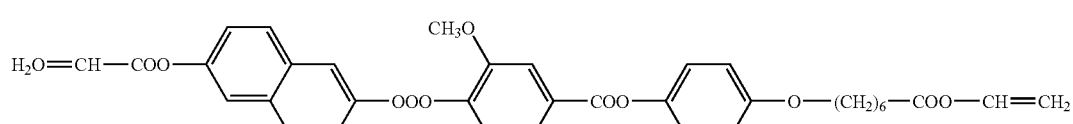
Compound No. 6
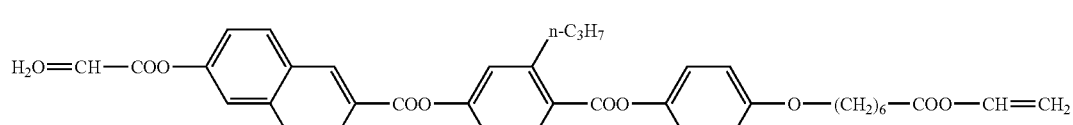
Compound No. 7
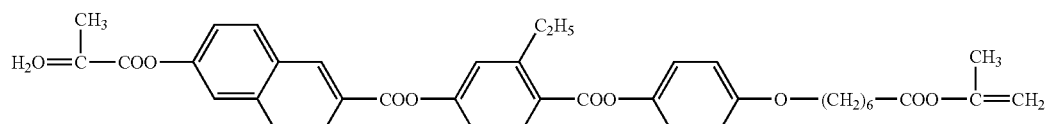
Compound No. 8
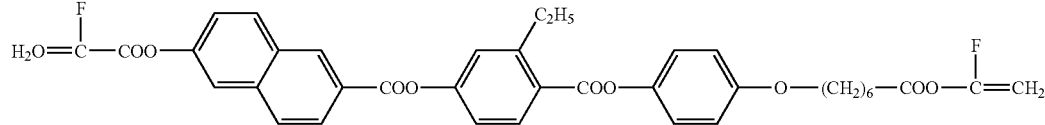
Compound No. 9
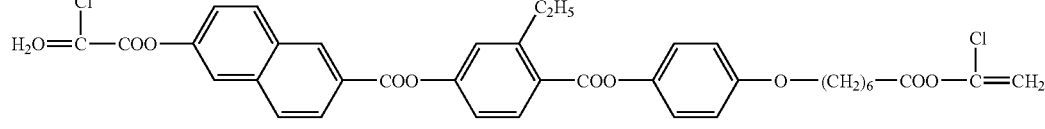
Compound No. 10
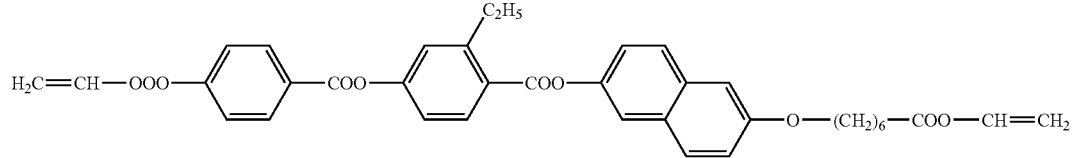

-continued
Compound No. 11
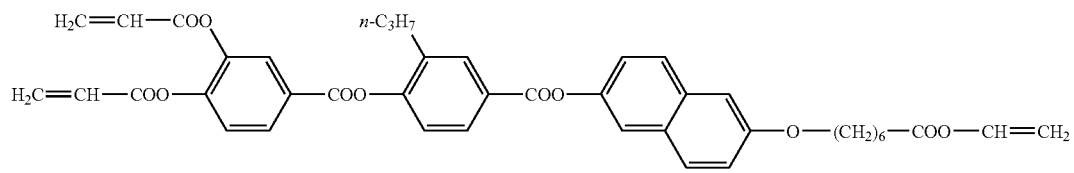
Compound No. 12
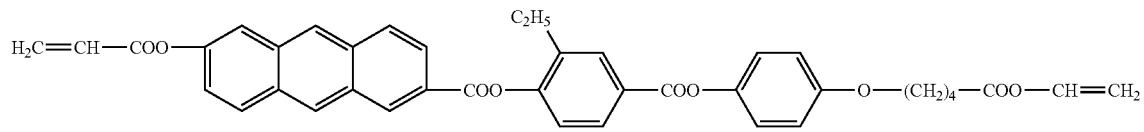
Compound No. 13
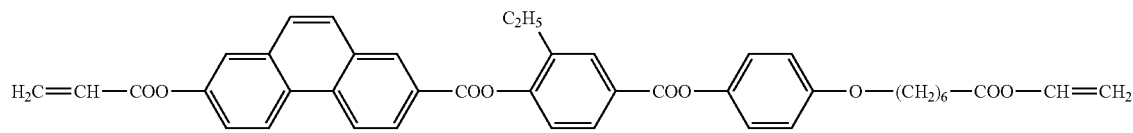
Compound No. 14
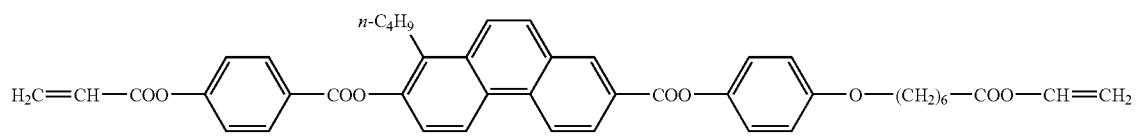
Compound No. 15
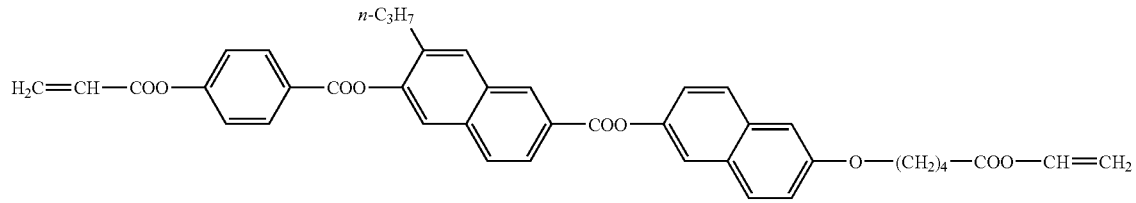
Compound No. 16
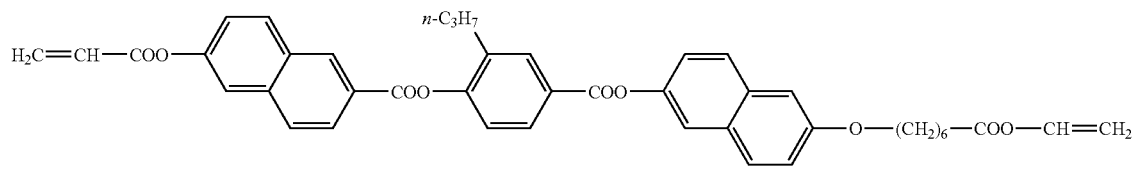
Compound No. 17
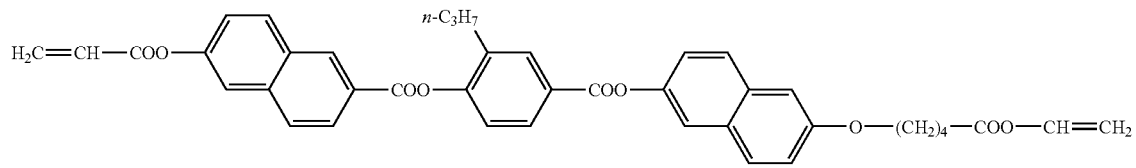
Compound No. 18
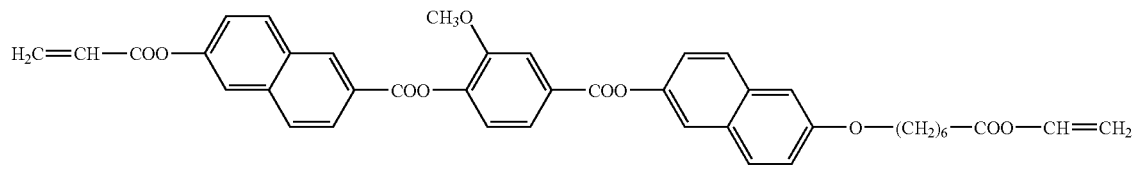

Compound No. 19
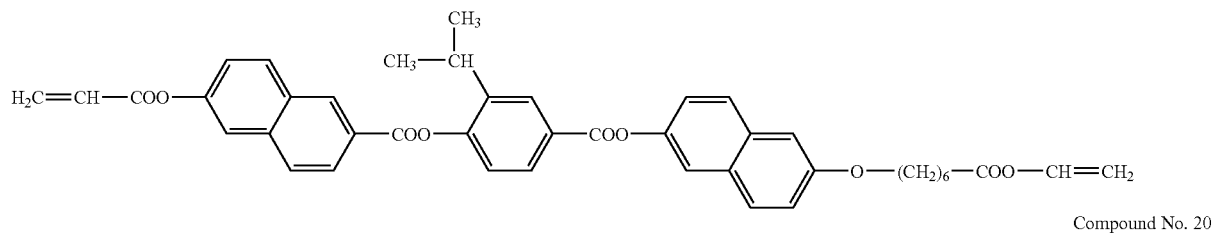
Compound No. 20
Compound No. 21
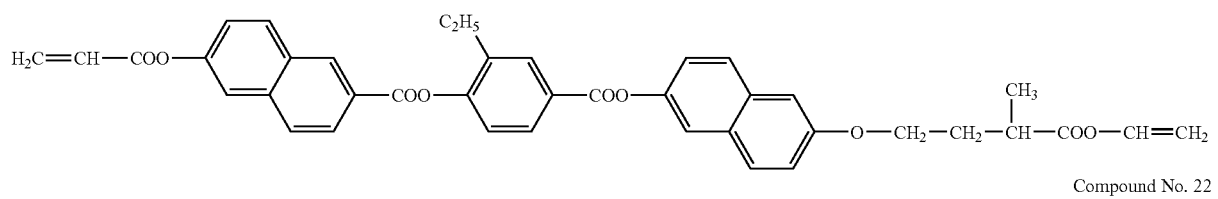
Compound No. 22
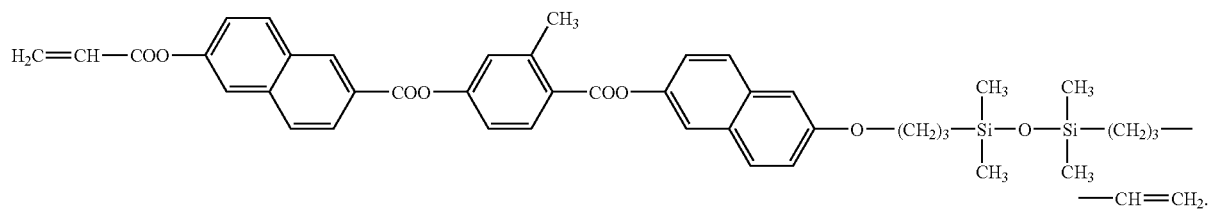
16. A polymerizable liquid crystal compound represented by general formula (1):
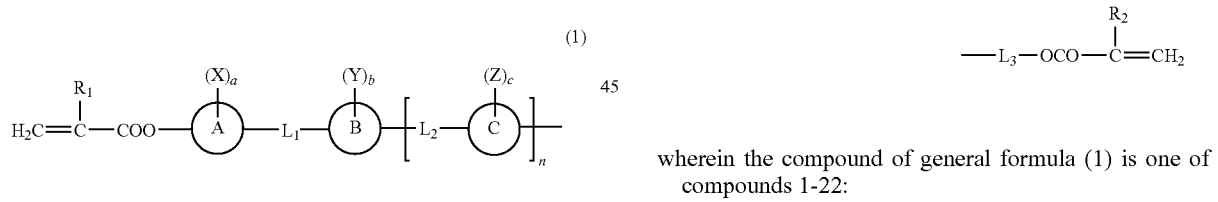
(1)
-continued
wherein the compound of general formula (1) is one of compounds 1-22:
Compound No. 1
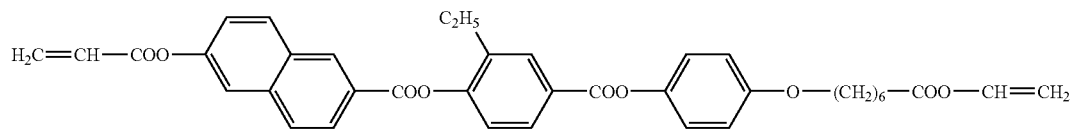
Compound No. 2
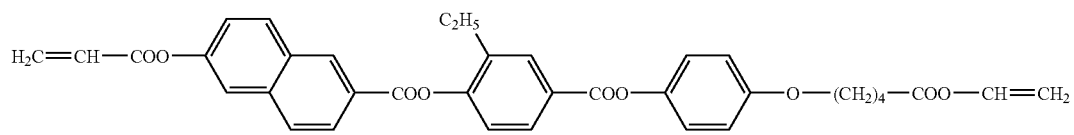

-continued
Compound No. 3
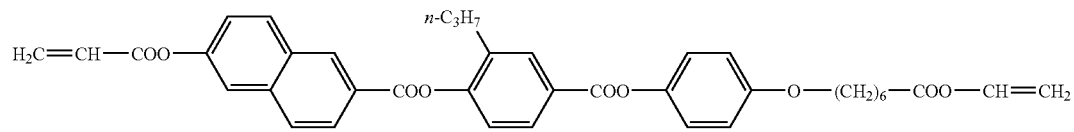
Compound No. 4
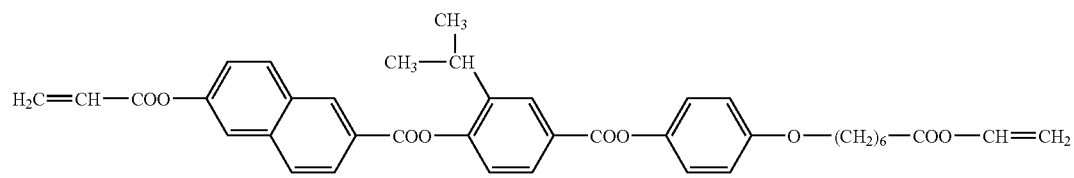
Compound No. 5
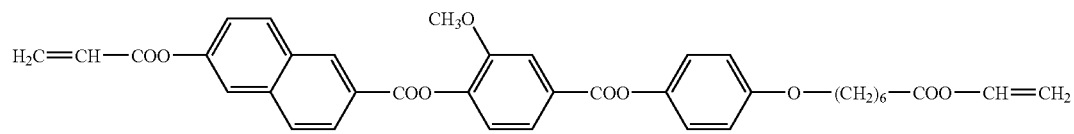
Compound No. 6
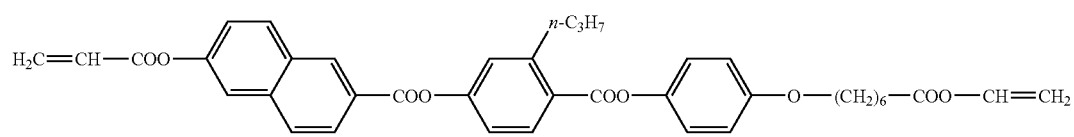
Compound No. 7
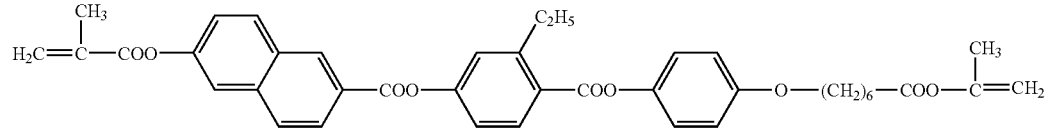
Compound No. 8
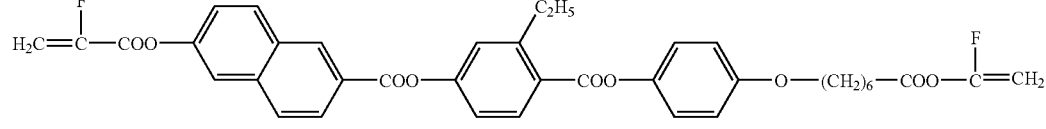
Compound No. 9
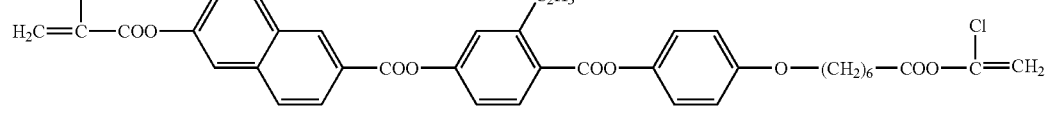
Compound No. 10
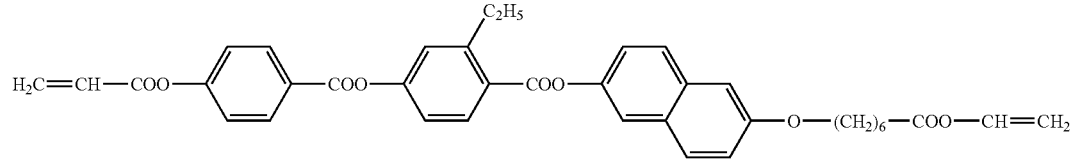
Compound No. 11
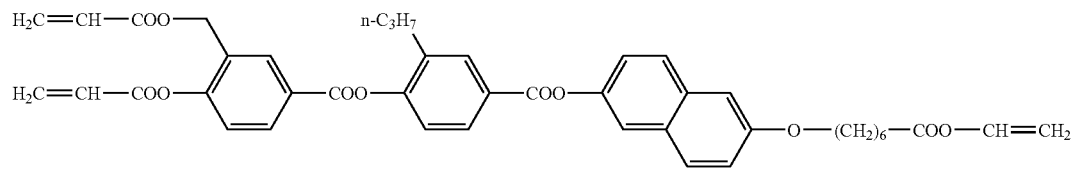

-continued
Compound No. 12
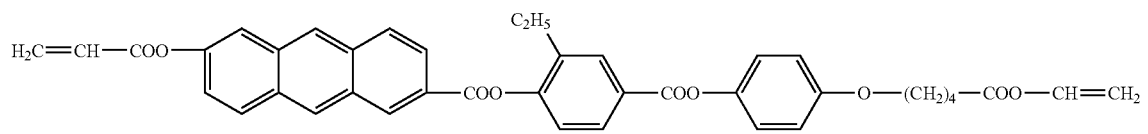
Compound No. 13
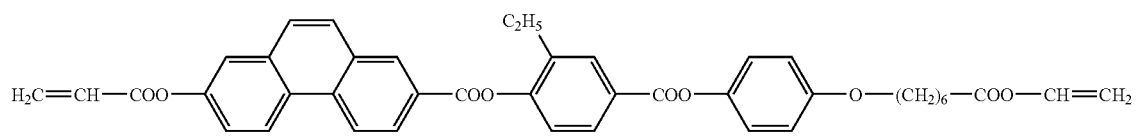
Compound No. 14
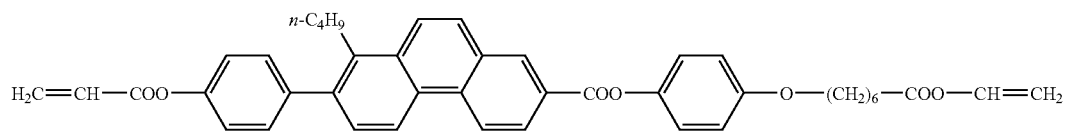
Compound No. 15
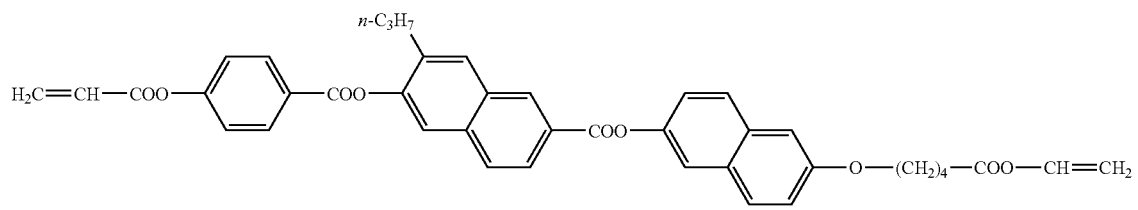
Compound No. 16
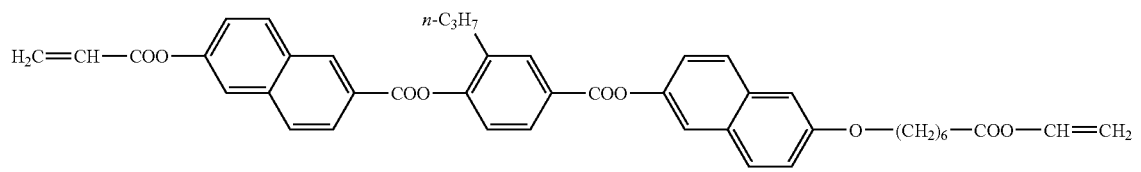
Compound No. 17
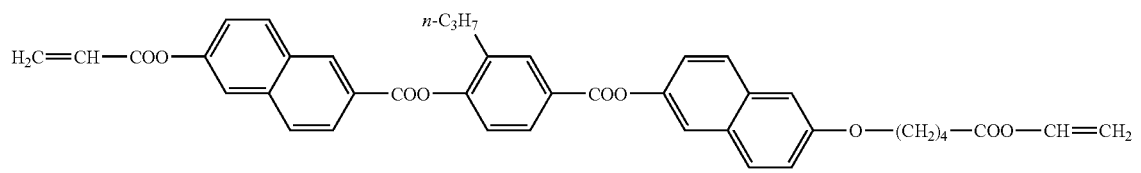
Compound No. 18
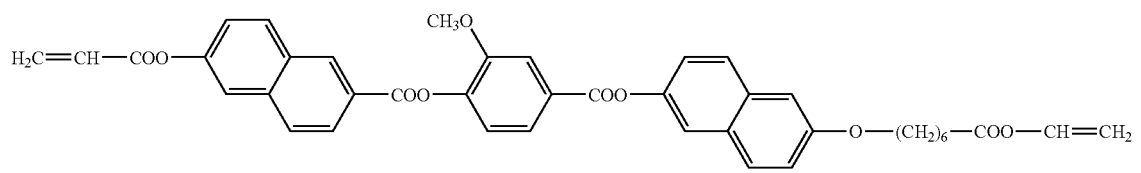
Compound No. 19
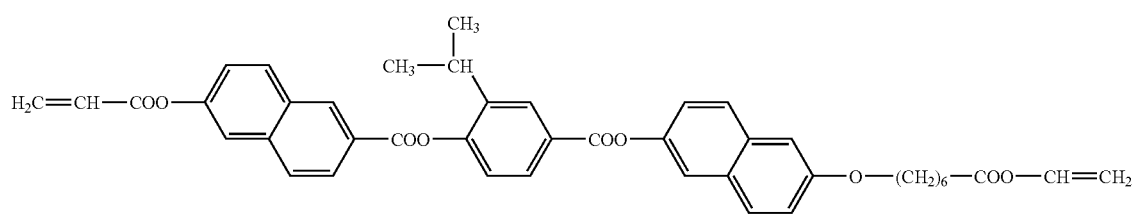

-continued
Compound No. 20
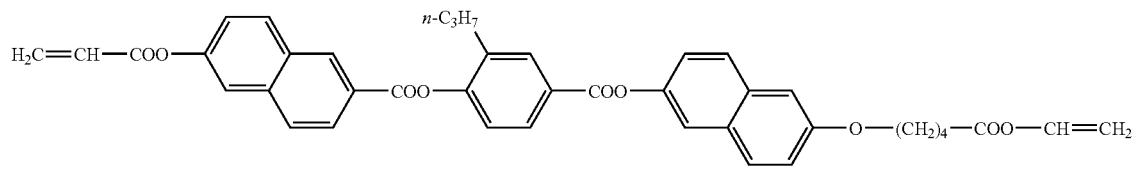
Compound No. 21
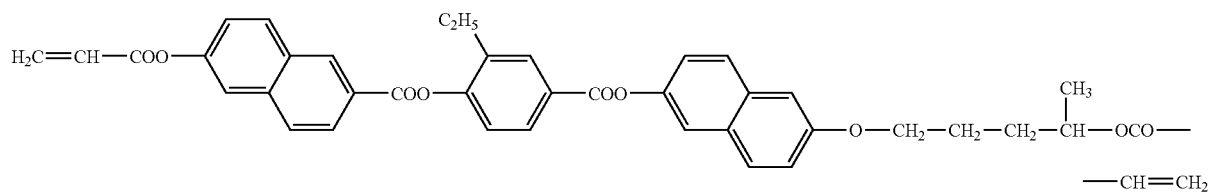
Compound No. 22
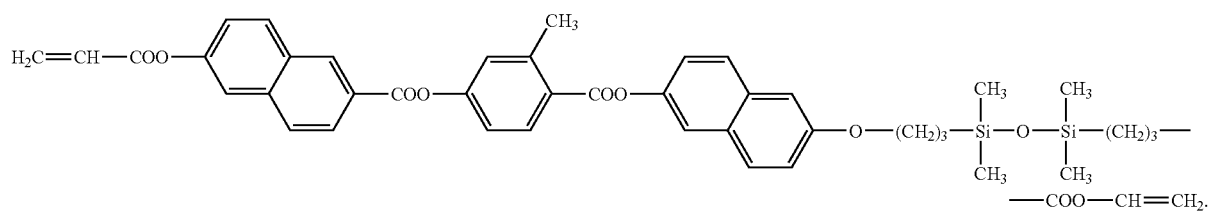

The invention claimed is:

1. A polymerizable liquid crystal compound represented by general formula (1):

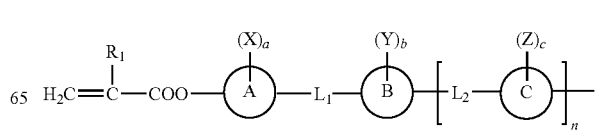

(1)

-continued

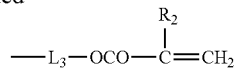

wherein $R_1$ and $R_2$ each independently represent a hydrogen atom, a methyl group or a halogen atom; rings A, B, and C each independently represent a benzene ring, a cyclohexane ring, a cyclohexene ring, a naphthalene ring, a tetrahydronaphthalene ring, a decahydronaphthalene ring, an anthracene ring or a phenanthrene ring, the —CH═ moiety of some of which rings may be substituted with —N═, and the —CH$_2$— moiety of some of which rings may be substituted with —S— or —O—; at least one of the rings A, B, and C is a fused ring; X, Y, and Z each independently represent a substituted or unsubstituted alkyl group having 1 to 6 carbon atoms, a substituted or unsubstituted alkoxy group having 1 to 6 carbon atoms, a substituted or unsubstituted alkenyl group having 2 to 6 carbon atoms, a halogen atom, a cyano group, or a group represented by general formula (2):

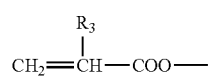 (2)

(wherein $R_3$ represents a hydrogen atom, a methyl group or a halogen atom); $L_1$, $L_2$, and $L_3$ each independently represent a single bond, —COO—, —OCO—, —(CH$_2$)$_h$—, —CH═CH—, —(CH$_2$)$_i$O—, —O(CH$_2$)$_j$—, —O(CH$_2$)$_k$O—, —OCOO(CH$_2$)$_l$—, —(CH$_2$)$_m$OCOO—, —(OCH$_2$CH$_2$)$_o$—, —(CH$_2$CH$_2$O)$_p$—, (OCH$_2$CH(CH$_3$))$_q$—, —(CH(CH$_3$)CH$_2$)$_r$—, —(CH$_2$)$_s$O(CH$_2$)$_t$—, —O(CH$_2$)$_u$—[Si(CH$_3$)$_2$O]$_v$—Si(CH$_3$)$_2$(CH$_2$)$_w$—, —CH═CHCH$_2$O—, —OCH$_2$CH═CH—, —CH═CH—COO—, —OCO—CH═CH—, —C≡C—, —(CH$_2$)$_2$COO—, —OCO(CH$_2$)$_2$—, —CF═CF—, —OCF$_2$—, —CF$_2$O—, —C≡C—COO—, —OCO—C≡C—, or —O—; part of the carbon atoms of $L_1$, $L_2$, and $L_3$ may be replaced with a silicon atom(s); n represents 0 or 1; h, i, j, k, l, m, and n each independently represent an integer of 1 to 8; o, p, q, r, s, t, u, v, and w each independently represent an integer of 1 to 3; a, b, and c represent the numbers of the substituents on the rings A, B, and C, respectively, being an integer of (2d+2) or smaller, where d is the number of the 6-membered rings contained in the monocyclic or fused rings A, B, and C, respectively; when n=0, at least one of a and b is 1 or greater; and when n=1, at least one of a, b, and c is 1 or greater.

2. The polymerizable liquid crystal compound of claim 1, which is represented by general formula (3):

wherein $R_1$, $R_2$, ring A, ring B, ring C, X, Y, Z, a, b, c, and j are as defined above; and at least one of the rings A, B, and C is a fused ring.

3. The polymerizable liquid crystal compound of claim 1, wherein at least two of the rings A, B, and C are fused rings.

4. A homopolymer obtained by polymerizing the polymerizable liquid crystal compound of claim 1.

5. A copolymer obtained by copolymerizing the polymerizable liquid crystal compound of claim 1 and another ethylenically unsaturated compound.

6. A copolymer obtained by copolymerizing the polymerizable liquid crystal compound of claim 1 and a comonomer having an optically active group.

7. An optically anisotropic material comprising at least one member selected from the group consisting of a homopolymer obtained by polymerizing the polymerizable liquid crystal compound of claim 1, a copolymer obtained by copolymerizing the polymerizable liquid crystal compound and another ethylenically unsaturated compound, and a copolymer obtained by copolymerizing the polymerizable liquid compound and a comonomer having an optically active group.

8. The polymerizable liquid crystal compound of claim 2, wherein at least two of the rings A, B, and C are fused rings.

9. A homopolymer obtained by polymerizing the polymerizable liquid crystal compound of claim 2.

10. A homopolymer obtained by polymerizing the polymerizable liquid crystal compound of claim 3.

11. A copolymer obtained by copolymerizing the polymerizable liquid crystal compound of claim 2 and another ethylenically unsaturated compound.

12. A copolymer obtained by copolymerizing the polymerizable liquid crystal compound of claim 3 and another ethylenically unsaturated compound.

13. A copolymer obtained by copolymerizing the polymerizable liquid crystal compound of claim 2 and a comonomer having an optically active group.

14. A copolymer obtained by copolymerizing the polymerizable liquid crystal compound of claim 3 and a comonomer having an optically active group.

15. The polymerizable liquid crystal compound of claim 1, wherein the polymerizable liquid crystal compound is represented by one of compounds 1-22:

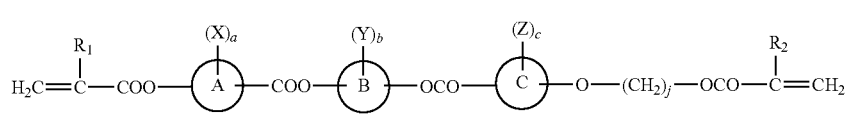 (3)